(12) United States Patent
Paintin

(10) Patent No.: US 8,407,121 B2
(45) Date of Patent: Mar. 26, 2013

(54) LOCATION-BASED MONEY TRANSFER

(75) Inventor: Scott Paintin, Littleton, CO (US)

(73) Assignee: The Western Union Company, Englewood, CO (US)

( * ) Notice: Subject to any disclaimer, the term of this patent is extended or adjusted under 35 U.S.C. 154(b) by 1031 days.

(21) Appl. No.: 12/346,577

(22) Filed: Dec. 30, 2008

(65) Prior Publication Data

US 2010/0169212 A1    Jul. 1, 2010

(51) Int. Cl.
*G06Q 40/00*    (2006.01)
(52) U.S. Cl. .......................................................... 705/35
(58) Field of Classification Search ............... 705/35–45
See application file for complete search history.

(56) References Cited

U.S. PATENT DOCUMENTS

| | | | |
|---|---|---|---|
| 6,488,203 | B1 | 12/2002 | Stoutenburg et al. |
| 2004/0205023 | A1 | 10/2004 | Hafer et al. |
| 2007/0095892 | A1 | 5/2007 | Lyons et al. |
| 2008/0083826 | A1 | 4/2008 | Henry et al. |
| 2008/0108324 | A1 | 5/2008 | Moshir et al. |
| 2008/0109375 | A1 | 5/2008 | Ricci et al. |
| 2009/0089193 | A1 | 4/2009 | Paintin |

OTHER PUBLICATIONS

International Application No. PCT/US2009/068584, International Search Report and Written Opinion, 9 pages, Mar. 3, 2010.

*Primary Examiner* — Richard C Weisberger
(74) *Attorney, Agent, or Firm* — Kilpatrick Townsend & Stockton LLP

(57) ABSTRACT

The invention provides various systems and methods for performing money transfers using location information. The method includes staging, at computer system, a money transfer transaction from a sender to a receiver. The method further includes providing the receiver's mobile number to the computer system, and tracking the receiver's location using a location tracking computer system. Further, the method includes determining if the receiver is within a proximity threshold to an agent location. The agent location is configured to distribute funds from the money transfer. The method then, in response to the receiver being within the proximity threshold to the agent location, notifies the receiver of the agent location's address, and dispenses the funds from the agent location.

14 Claims, 8 Drawing Sheets

LOCATION-BASED MONEY TRANSFER

FIELD OF THE INVENTION

The present invention relates, in general, to money transfers, and more particularly, to location-based money transfers.

BACKGROUND OF THE INVENTION

Currently, businesses use location information about their customers to advertise services. For example, a retailer may track the location of a customer and, when that customer is in close proximity to one of the retailer's store locations, the retailer notifies the customer. Then, the customer may be enticed into visiting the retailers' store location. This use of location information has a number of shortcomings. For example, this is a one-sided system, in that it passively waits for a customer to come into close proximity to the store location, and then notifies the customer, such that there is no interaction from the customer. In addition, this type of system does not facilitate two-sided transactions between individuals and/or businesses. Accordingly, improvements in the art are needed.

BRIEF SUMMARY OF THE INVENTION

The present invention provides a method for performing money transfers using location information. The method includes staging, at a computer system, a money transfer transaction from a sender to a receiver. The method further includes providing the receiver's cellular telephone number to the computer system, and tracking the receiver's location using a location tracking computer system. Further, the method includes determining if the receiver is within a proximity threshold to an agent location. The agent location is configured to distribute funds from the money transfer. The method then, in response to the receiver being within the proximity threshold to the agent location, notifies the receiver of the agent location's address, and dispenses the funds from the agent location.

An alternative embodiment provides a method for location-based management of a mobile wallet. The method includes receiving an electronic funds transfer for a customer's mobile wallet, wherein the electronic funds transfer includes a funding amount, and checking the mobile wallet's balance to determine if receiving the funding amount would exceed a balance limit for the mobile wallet. The method further includes checking the mobile wallet's transfer amount limit to determine if the funding amount exceeds the transfer amount limit, and in response to the funding amount either exceeding the balance limit or the transfer amount, sending an electronic notice to the customer for the customer to receive the funds at a money transfer location instead of in the customer's mobile wallet.

Further, the method includes, in response to the customer agreeing to receive the funds at a money transfer location instead of in the customer's mobile wallet, determining the customer's location using a location tracking system (e.g., global positioning system (GPS) or cellular positioning device); and based on the customer's location, notifying the customer of one or more agent locations near the customer for retrieving the money transfer.

A further embodiment provides a method for implementing location-based bill-pay. The method includes determining that a customer has at least one bill due to a service provider, and tracking the customer's location using a global positioning system (GPS), cellular functionality in the customer mobile device, or other location tracking system. The method further includes determining, from GPS, cellular or other location tracking information, that the customer is in proximity to a bill-pay agent location, notifying the customer of the at least one bill due and the location of at least one bill-pay agent location, and receiving payment to the service provider for the at least one bill due at the bill-pay agent location.

A further embodiment of the present invention provides for a method of providing location-based funds transfers. The method includes providing, by a receiver via the receiver's computing device, a money transfer request. The request includes an amount and a proposed sender's contact information. The method further includes tracking the proposed sender's location using the contact information, and determining, using a location gathering computer system, that the proposed sender is in proximity to a money transfer agent location capable of processing the money transfer request. Further, the method includes notifying the proposed sender of the money transfer request received from the receiver and the location of one or more money transfer agent locations.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Aspects of the present invention relate to location-based money transfer and bill-pay methods and systems. One particular aspect of the present invention is to utilize location information of customers (actual or proposed senders and/or receivers) in order to facilitate money transfers and bill-pay transactions. In one embodiment, a customer sending or receiving a money transfer can be directed to one or more agent locations based in part on the customer's location, pendency of a money transfer, proximity to an agent location, etc. Similarly, a customer can be directed to a location to pay a bill(s) based on the customer's location, a bill-pay location, etc. Accordingly, the present invention reduces travel and transaction time, reduces money transfer payout delay, and so forth. In the present invention, a customer's "location" can be the customer's actual or most recently known location at any given point in time or may be an estimate of the customer's expected location, which may be determined using a variety of current and/or historical factors.

Figure 1:
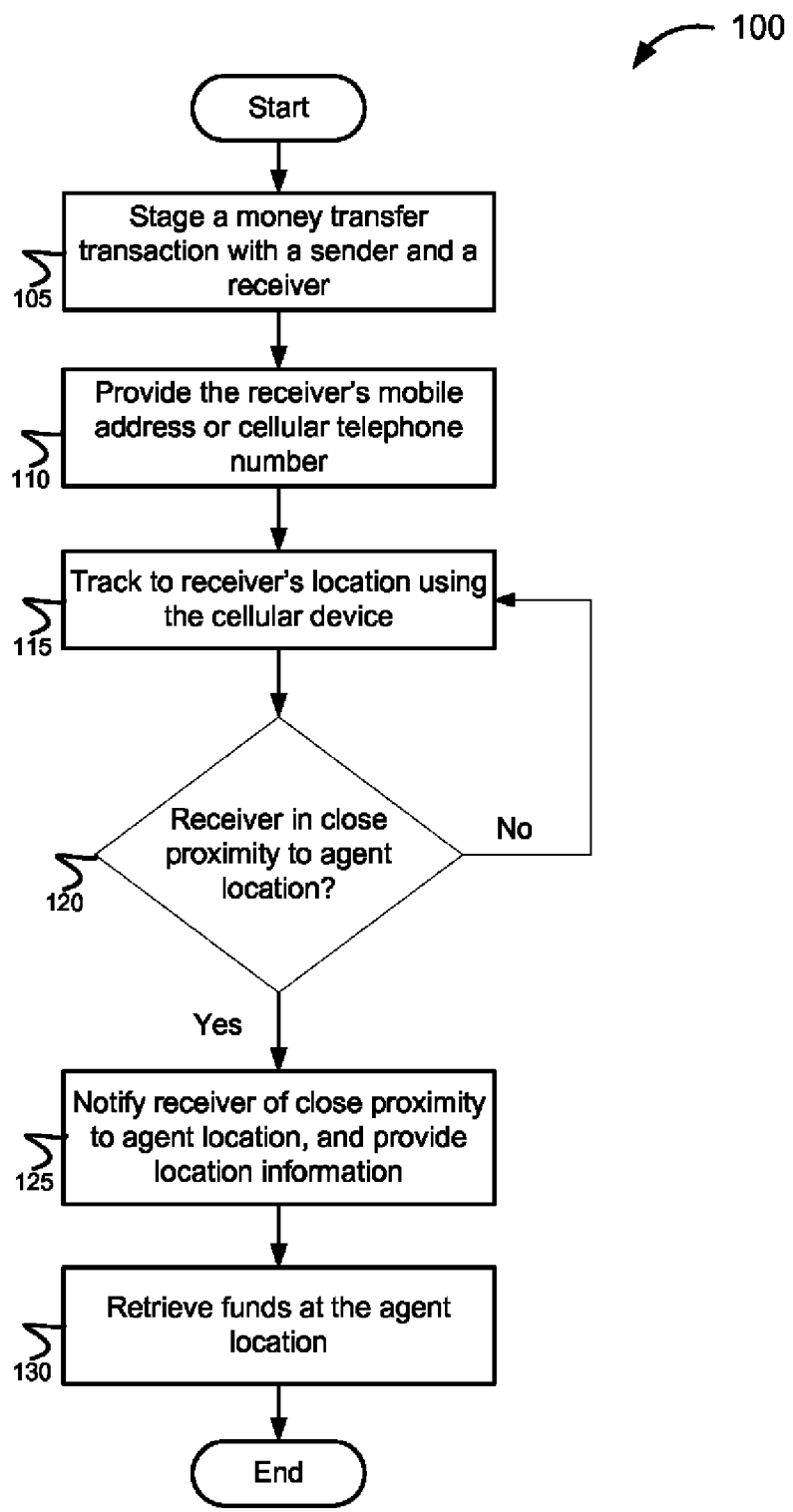
FIG. 1 is a flow diagram illustrating a method of performing a money transfer using location information, according to one embodiment of the present invention.

Turning now to FIG. 1, a flow diagram which illustrates a method 100 for implementing location-based money transfers, according to one embodiment of the present invention. At process block 105, a money transfer (or similar financial transaction) may be staged (or initiated) between a sender and a receiver. For example, the sender (located in Mexico) may desire to send money to the receiver (a family member) in Ohio. Accordingly, the sender initiates a money transfer to the receiver, which may include a money transfer amount, contact information for the receiver (e.g., name, address, (where necessary or desirable), etc.), etc. A sender may be required to complete a send form, which may include, for example, the sender's name, address and telephone number, as well as the receiver's name, transfer amount and expected payout location. Alternatively, a sender may provide his or her loyalty card, loyalty number or telephone number to send money without using a form to populate the sender's information and to select a receiver from a list of recent receivers (if any). The money transfer is then processed by a financial services company (e.g., Western Union), and after passing appropriate queues (e.g., Office of Foreign Assets Control, fraud, interdiction, etc.), a Money Transfer Control Number (MTCN) may be generated. The funds are made available to the receiver for retrieval. The funds may be retrieved at an agent location (e.g., an automated teller machine (ATM); a convenience store, a gas station, a shopping center, a grocery store, or other merchant or retailer; a bank (including for payout at the counter or directly into an account); a check casher; a post office; a kiosk, or any other authorized agent of the financial services company authorizing the transaction), and until the funds are retrieved the transaction is stored within the financial services company's system.

In addition to providing the receiver's name, address, etc., the sender may also provide a mobile address of the receiver (process block 110). The mobile address may be, for example, a cellular telephone number, a global positioning system (GPS) location address, an Internet domain associated with a mobile device, an e-mail address, a Subscriber Identity Module (SIM) identifier, etc. In a further embodiment, the GPS device may be in a vehicle navigation system, a portable navigation system, and the like. The mobile address may be any address (or locator) which may be used to determine the receiver's location. Merely for explanation purposes assume that the mobile address is a cellular telephone number for the receiver's GPS enabled mobile device (e.g., a personal digital assistant (PDA), a Smartphone, a cellular telephone, a portable computer, a laptop computer, etc).

At process block 115, using the receiver's cellular telephone number (or other location address), the receiver's location may be tracked. For example, the receiver's cellular signal may be used to triangulate the receiver's location using cellular service towers. Alternatively, the receiver's GPS device within the cellular device may be used to determine the receiver's location using GPS satellite tracking. Similarly, a mesh network may be used to determine the receiver's location. Accordingly, based on the information received, either from the cellular triangulation or GPS location information, the receiver's current location may be tracked/identified.

In one embodiment, a determination may be made regarding the receiver's proximity to an agent location that would be able to dispense the funds associated with the money transfer initiated by the sender. At decision block 120, a determination is made whether the receiver is in "close" proximity to an agent location(s). In one embodiment, the closeness of the proximity may be determined based on a distance threshold value. For example, a receiver may be considered close to an agent location if the receiver is within five miles of the agent location (i.e., a five mile threshold). Alternatively, a time threshold may be used. For example, the receiver may be "close" to an agent location if, based on one or more of traffic, road conditions, weather condition, etc., the agent location may be reached within ten minutes. Alternatively, no threshold value may be used, and the receiver may simply be notified of all agent locations available within a certain mileage radius (e.g., fifty mile radius, one hundred mile radius, etc.).

Once it is determined that the receiver's location is in close proximity to an agent location(s), the receiver may then be notified of his or her proximity to the agent location(s) and provided with location information for one or more agent locations. Such a notification may be delivered using short message service (SMS) texts, email, voicemail, instant messaging, a telephone call, etc. Furthermore, the location information may include the agent location's address, telephone number, hours of operation, services provided, etc., as well as detailed directions to the agent location. The directions may be based on the current location of the receiver, or may be generic directions (e.g., directions from major highways, directions coming from the north, south, etc.).

In a further embodiment, the notification may include a barcode (or certified image) or the like which may be displayed on the mobile device's display screen. The barcode may be used at the agent location to retrieve the funds. For example, the barcode may be scanned at the agent location, and based on the authenticity of the barcode, the funds may be distributed to the receiver. Furthermore, the mobile device may include various biometric security devices (e.g., a voice recognition device, a fingerprint scanner, a retinal scanner, etc.). Thus, in order to provide secure retrieval of the funds, security safeguards may be used. In addition, the transmission of the notification may be secured using encryption, password protection, or the like.

At process block 130, using the agent location information, the receiver can then retrieve the funds from the money transfer at the nearest (or desired) agent location. The receiver may be required to one or more of the following: complete a receive form (which may include, for example, receiver's name, telephone number, address, and an indication of from where the money was sent), present personal identification, an account or transaction number (e.g., MTCN), a personal identification number (PIN), biometric information, barcode, etc. The receiver may also provide loyalty and/or rewards program identification or information during the transaction.

Such a location-based distribution mechanism facilitates in the reduction of transfer errors. For example, if a receiver has a similar or the same name as another receiver, the funds may be erroneously transferred to the wrong person. In some instances the longer the pending transaction is stored within the financial services company's system, the more concerned some customers may be that the transaction will be lost or improperly paid. Thus, by informing receivers of the one or more nearby locations to retrieve their funds, the funds will be in the system for less time. Furthermore, since the money transfer is completed in connection with the receiver's location, it is more likely that the correct receiver has been identified.

Figure 2:
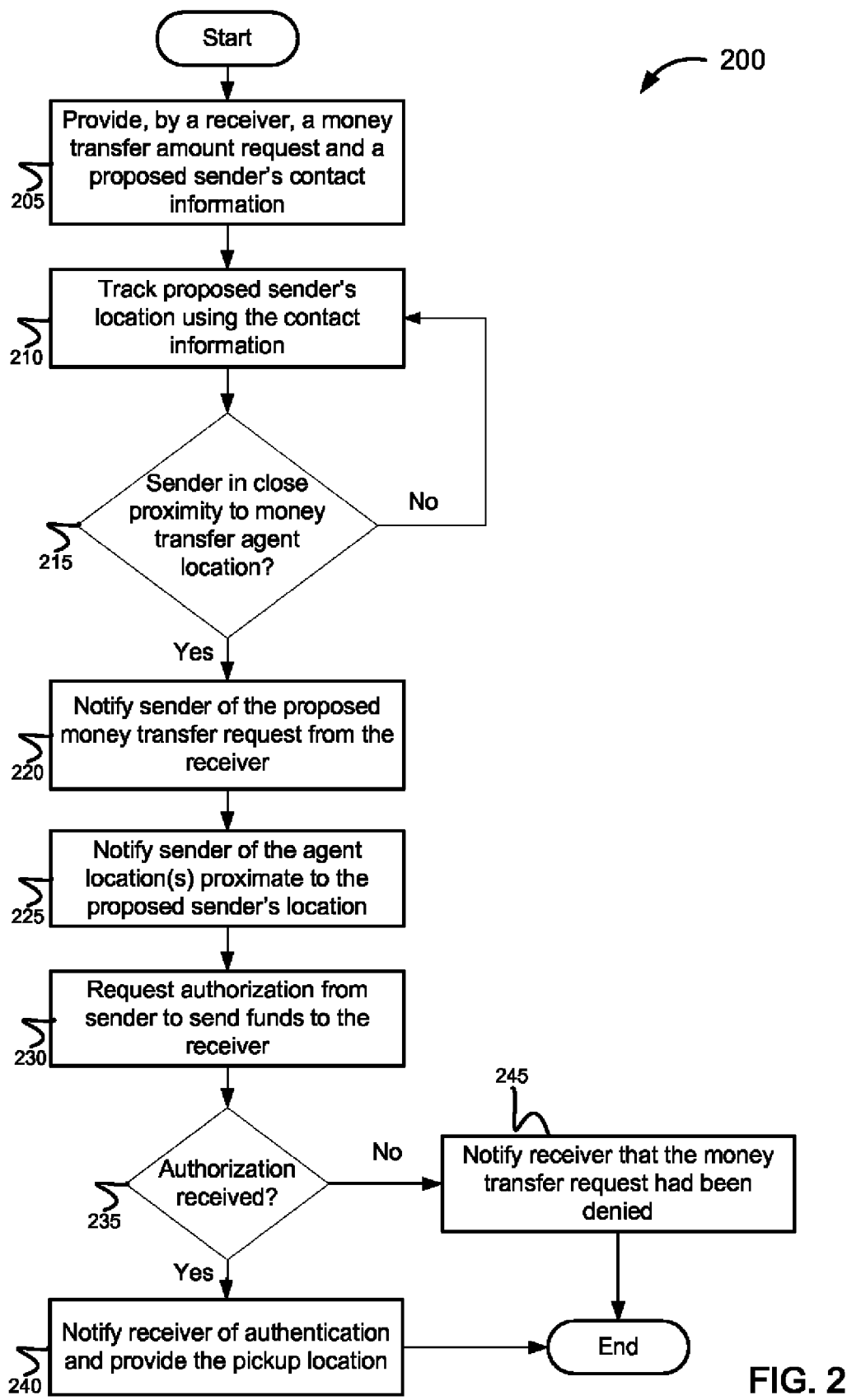
FIG. 2 is a flow diagram illustrating a method of performing a money transfer using location information, according to one embodiment of the present invention.

Referring now to FIG. 2, a flow diagram which illustrates a method 200 for implementing location-based money transfers, according to an alternative embodiment of the present invention. At process block 205, a "potential" receiver may provide a money transfer request. The request may include a request amount as well as a "proposed" sender's contact information. In other words, a customer (e.g., a college student in New York) sends a request to her parents (e.g., a proposed sender in California) asking for money to be transferred.

Accordingly, in order to facilitate the money transfer, the proposed sender's location may be tracked using the contact information (e.g., the proposed sender's cellular telephone number). Similar to the process described above in FIG. 1, a determination of the proposed sender's proximity to an agent location is made (decision block 115). Then, at process block 220, once the proposed sender is in close proximity to an agent location(s), a notification of the money transfer request from the receiver may be transmitted to the proposed sender.

In addition, at process block 225, the proposed sender may also be notified of the agent location(s) proximate to the proposed sender's location. Furthermore, an authorization request may be transmitted to the proposed sender requesting authorization of the money transfer requested by the receiver (process block 230). At decision block 235, a determination is made whether the proposed sender has granted authorization of the requested money transfer. If the proposed sender rejects the money transfer request, then the receiver may be notified (process block 245). Conversely, if the proposed sender authorizes the money transfer, the money transfer could be staged. Then the sender would go to an agent location (e.g., the closest identified agent location), and initiate the money transfer. Further, at process block 240, the receiver may be informed of the acceptance and initiation or fulfillment of the requested money transfer. Staging and fulfillment of money transfer transactions is more fully described in Method and System for Performing Money Transfer Transactions, U.S. Pat. No. 6,488,203, the complete disclosure of which is hereby incorporated by reference. As such, the process of FIG. 1 may then be used to facilitate retrieval of the transferred funds by the receiver.

Figure 3:
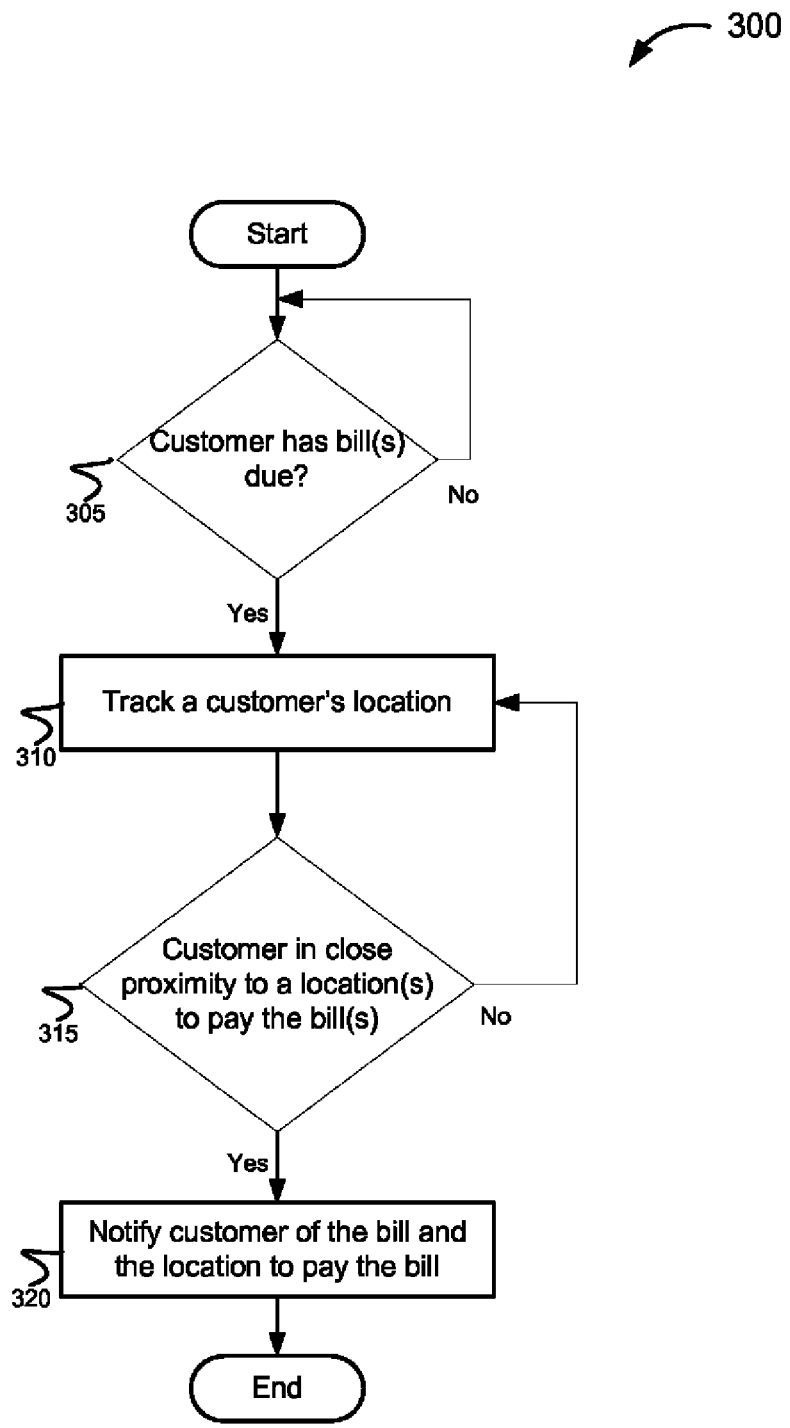
FIG. 3 is a flow diagram illustrating a method of performing a money transfer using location information, according to one embodiment of the present invention.

Referring next to FIG. 3, which illustrates a method 300 for implementing location-based bill-pay, according to one embodiment of the present invention. At decision block 305, a determination may be made whether a customer has any bills due. For example, the customer may enroll in a bill-pay program with the financial services provider, in which the customer's bills are received and processed through the financial services provider's bill-pay system. Bill-pay systems are more fully described in Bill Payment Aggregation Service, U.S. patent application Ser. No. 11/863,906, the complete disclosure of which is hereby incorporated by reference. Accordingly, each bill's due date and amount owed is known by the bill-pay system. Hence, if no bills are currently due for the customer, method 300 continues to make the determination at decision block 305 until a bill comes due.

Thus, once it is determined that the customer has a bill (or bills) due, the customer's location may then be tracked (process block 310). The tracking may be similar to the tracking described above in FIGS. 1 and 2. Once the customer's location is tracked, it is determined whether the customer is in close proximity to a bill-pay location(s) (decision block 315).

If the customer is not in close proximity (i.e., the customer's proximity to the bill-pay location is not within a threshold distance), then the customer's location may continue to be tracked (process block 310) until it is determined that the customer is in close proximity to a bill-pay location(s). Alternatively, the customer may be notified of one or more agent locations that are relatively closest even if they are not in close proximity.

If it is determined that the customer is in close proximity to a bill-pay location(s), then at process block 320, the customer may be notified of the bill(s) owed, the amount of the bill(s), and the location of the bill-pay location. Accordingly, the customer may simply go to an identified bill-pay location and pay the outstanding bill. Alternatively, method 300 may be used by creditors such that as a debtor is determined to be in close proximity to a location which the debtor may pay the creditor, the creditor can notify and/or contact the debtor, and direct the debtor the payment location. A bill-pay location or payment location may be an agent location. Furthermore, the bill or bills owed may be to, for example, a utility company, a department store, a car dealership, etc., and the bill-pay location may be located at one of these types of storefronts.

Figure 4:
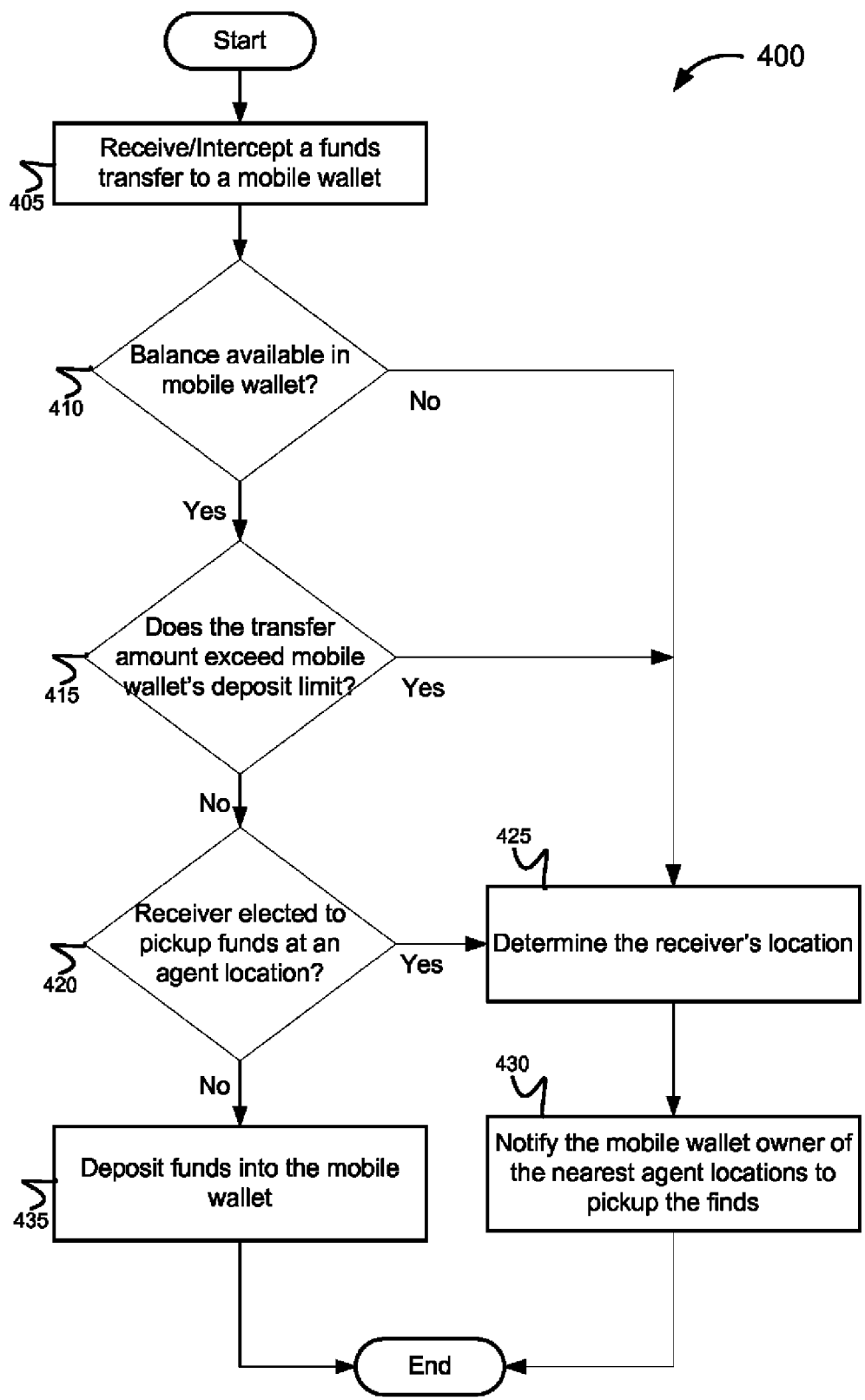
FIG. 4 is a block diagram illustrating a system for providing universal access to loyalty programs and/or financial accounts, according to one embodiment of the present invention.

Turning now to FIG. 4, which illustrates a method 400 for implementing location-based money transfers in connection with a mobile wallet, according to another embodiment of the present invention. At process block 405, a funds transfer to a mobile wallet may be held/received/intercepted before being delivered. At decision block 410, a determination is made of the available balance for the mobile wallet. Some mobile wallets have a balance limit (e.g., 500 dollars, 100 dollars, etc.) and deposits made that would exceed the mobile wallet's balance may be denied.

If it is determined that there is sufficient balance available in the mobile wallet then, at decision block 415, a determination is made whether the funds transfer amount exceeds the mobile wallet's transfer amount limit. For example, in addition to a balance limit, a mobile wallet may also have a single transfer amount limit (e.g., 1000 dollars, 5000 dollars, etc.). If it is determined that the funds transfer amount does not exceed the transfer amount limit, then at decision block 420, it is determined whether the receiver (or owner of the mobile wallet) has elected to receive the funds at an agent location instead of having the funds deposited into the mobile wallet. The receiver may have the option of electing to receive the funds at an agent location instead of having the funds deposited into the mobile wallet on a transfer-by-transfer basis, or the receiver may have the option of providing standing orders relating to receipt of funds at an agent location instead of having the funds deposited into the mobile wallet. For example, a receiver may elect to receive at an agent location all funds sent to his or her mobile wallet. Alternatively, a receiver may opt to set thresholds that will be applied to funds sent to his or her mobile wallet (e.g., transfers of $100 or less will be received into the mobile wallet, but all others will be received at an agent location). Similarly, a receiver may opt to have transfers from one sender received into a mobile wallet, while transfers from another sender will be received at an agent location. Further, a receiver may opt to have transfers where an exchange of currencies occurs made available for receipt at an agent location, while transfers with no foreign exchange are received into the mobile wallet, or vice versa. In one embodiment, the mobile wallet may charge a transaction fee for receiving the transfer, while the financial services company would charge a reduced fee or no fee if the owner of the mobile wallet elects to receive the funds at an agent location.

Hence, if the owner of the mobile wallet does not elect to retrieve the funds at an agent location, then at process block 435, the funds are deposited into the mobile wallet. Alternatively, if the balance limit of the mobile wallet would be exceeded by the funds transfer, the funds transfer amount exceeds the transfer limit of the mobile wallet, or the owner of the mobile wallet elects to receive the funds at an agent location, then at process block 425, the owner of the mobile wallet's location may be determined. The mobile wallet may be associated with a mobile device or an associated identifier (e.g., cellular telephone number), and based on the cellular device's location, the owner's location may be determined. Accordingly, any location determination process described herein may be used.

Therefore, once the location of the mobile wallet owner is determined, the owner may be notified of one or more location(s) where the mobile wallet owner may retrieve the funds (process block 430). In addition, if the mobile wallet owner decides to have the funds transferred into the mobile wallet, the owner's location may still be determined and the owner notified of nearby agent location(s) that can be used to retrieve all or part the funds from the mobile wallet. The mobile device may also later be used to query whether there are nearby agent location(s) that can be used to retrieve all or part the funds (whether obtained by a transfer, load, credit or otherwise) from the mobile wallet. Queries can be made by text message, e-mail, standard web pages (e.g., HTML, XML, etc.), WAP pages (e.g., WML), or any other available means.

Figure 5A:
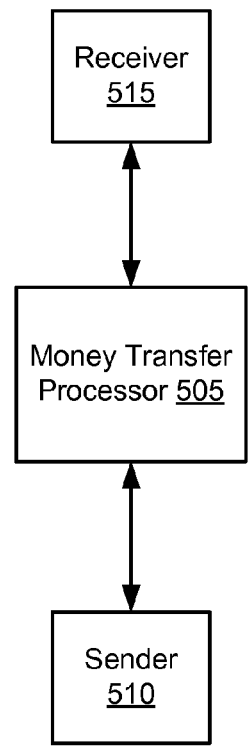
FIGS. 5A and 5B are block diagrams illustrating systems used for performing a money transfer using location information, according to one embodiment of the present invention.

Turning next to FIG. 5A, a block diagram illustrates a system for implementing location-based funds transfers according to one embodiment of the present invention. The system may include a money transfer processor 505, a sender 510 and a receiver 515. Money transfer processor 505 may be a financial services provider configured to provide a variety of financial transaction services, including money transfers. Furthermore, money transfer processor 505 may include a location tracking module used to determine a customer's location using a mobile or cellular device or the like.

In one embodiment, sender 510 may initiate a money transfer directed to receiver 515. The money transfer may include an amount, information about receiver 515, receiver 515's cellular telephone number or other address information, etc. Hence, methods 100 and/or 200 may be implemented using the system of FIG. 5. For example, money transfer processor 505 may track the locations of sender 510 and/or receiver 515 in order to determine one or more nearby agent locations for which sender 510 and/or receiver 515 are able to initiate a money transfer or retrieve funds, respectively.

Figure 5B:
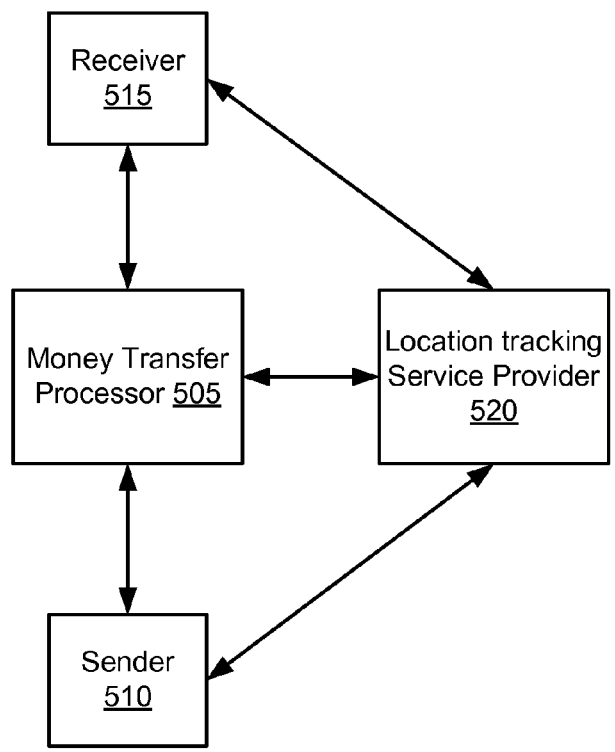

Alternatively, in FIG. 5B, the system includes a location tracking service provider 520. In one embodiment, location tracking service provider 520 may be configured to track the location of sender 510 and/or receiver 515 and transmit such location information to money transfer processor 505. Furthermore, location tracking service provider 520 may receive agent location information which can then be used in conjunction with the locations of sender 510 and/or receiver 515 to direct sender 510 and/or receiver 515 to one or more agent location(s).

Figure 6A:
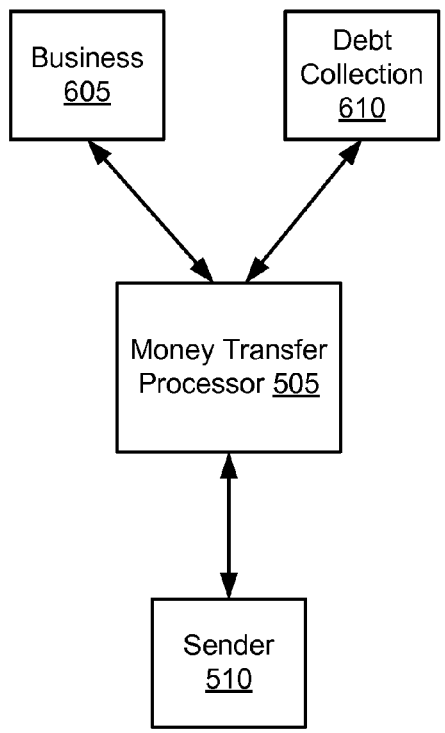
FIGS. 6A and 6B are block diagrams illustrating systems used for performing a money transfer using location information, according to one embodiment of the present invention.
Figure 6B:
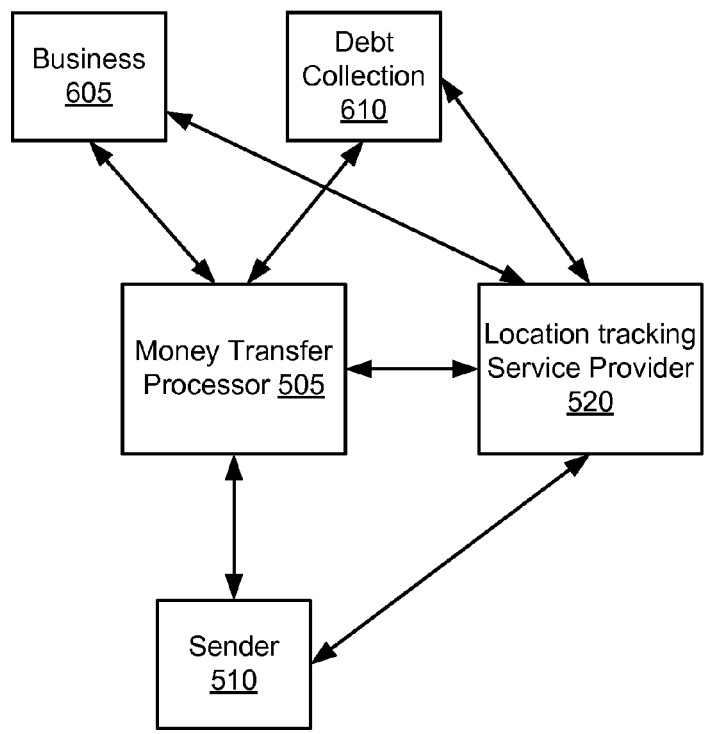

Referring now to FIG. 6A, a block diagram which includes a business 605 (e.g., a department store, a convenience store, a utility company, an auto dealership, etc.) and a debt collection 610 (e.g., a collection agency, a credit card company, a mortgage company, etc.). Accordingly, the system in FIG. 6A may be used to implement method 300 in FIG. 3, in order to facilitate bill payments and/or debt collection from sender 510. As such, money transfer processor 505 may be configured to determine outstanding bills and/or debts owed by sender 510, and sender 510's location in order to direct sender 510 to locations where sender 510 may pay bills and debts owed to business 605 and/or debt collection 610. Alternately, in FIG. 6B, the location of sender 510, business 605 and debt collection 610 may be determined independently from money transfer processor 505 using location tracking service provider 520. In each of the embodiments, an estimate of the customer's expected location may be determined using a variety of current and/or historical factors. For example, based on the customer's current location or most recently known location, the systems and methods of the present invention may be used to estimate the customer's future location based on one or more data elements, which may include the customer's heading and/or speed, traffic conditions, road closures, construction, weather conditions, time of the day, day of the week, and historical information about the customer (such as information relating to one or more past trip of the customer, agent locations previously used or visited by the customer, etc.), and any other factors that may be relevant to estimating a customer's future location, whether or not in the near future.

Figure 7:
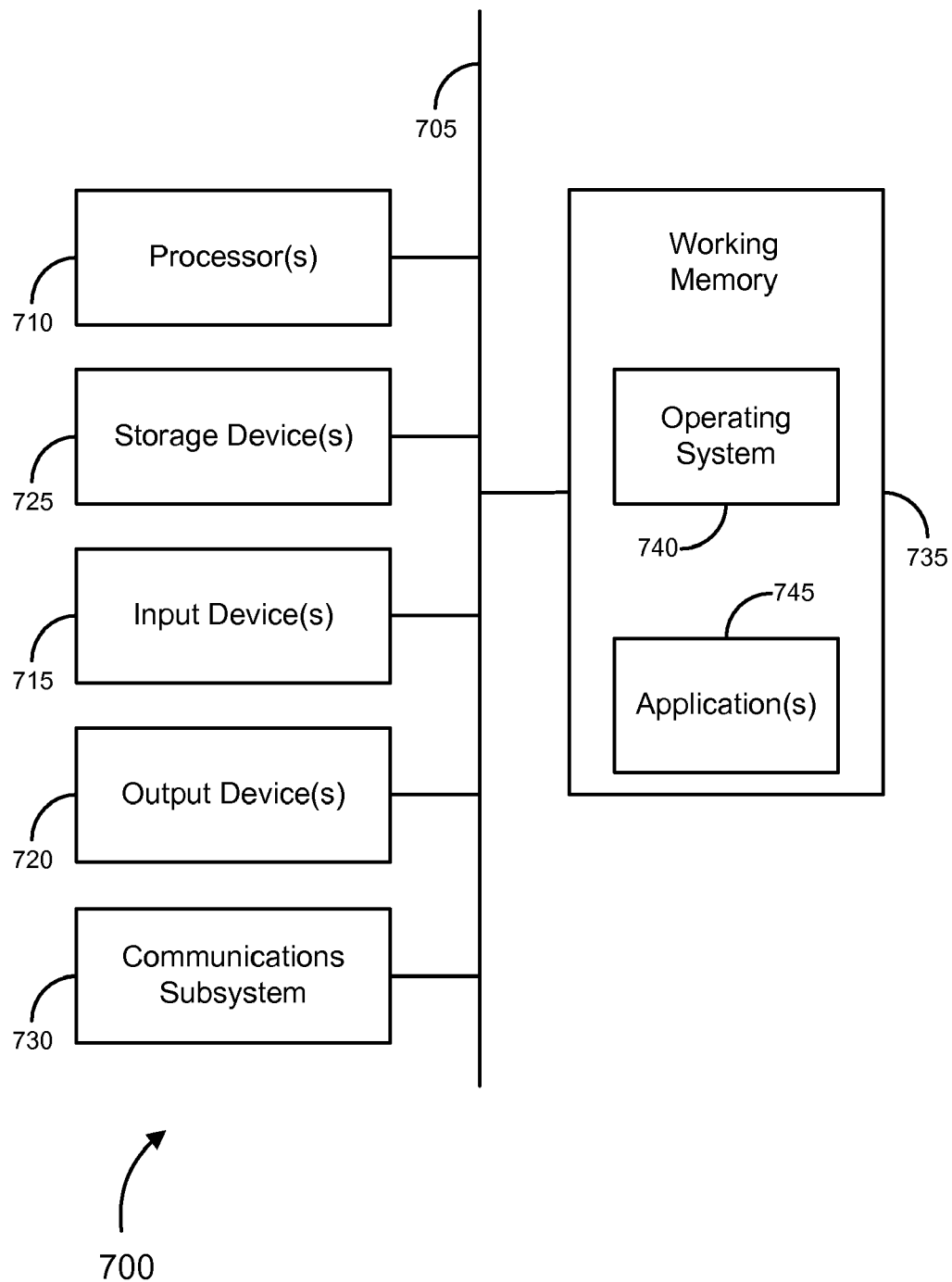
FIG. 7 is a generalized schematic diagram illustrating a computer system, in accordance with various embodiments of the invention.

FIG. 7 provides a schematic illustration of one embodiment of a computer system 700 that can perform the methods of the invention, as described herein, and/or can function as, for example, money transfer processor 505 (FIGS. 5A and 5B), location tracking service provider 520 (FIGS. 5A and 5B), etc. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements can include one or more processors 710, including, without limitation, one or more general purpose processors and/or one or more special purpose processors (such as digital signal processing chips, graphics acceleration chips, and/or the like); one or more input devices 715, which can include, without limitation, a mouse, a numeric keypad, a keyboard, a touch screen, and/or the like; and one or more output devices 720, which can include, without limitation, a display device, a printer, a sound card and/or the like.

The computer system 700 may further include (and/or be in communication with) one or more storage devices 725, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, mesh network, etc.), and/or the like. The communications subsystem 730 may permit data to be exchanged with a network (such as the network described below, to name one example), and/or any other devices described herein. In many embodiments, the computer system 700 will further comprise a working memory 735, which can include a RAM or ROM device, as described above.

The computer system 700 can also comprise software elements, shown as being currently located within the working memory 735, including an operating system 740 and/or other code, such as one or more application programs 745 or Application Programming Interfaces (APIs), which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 725 described above. In some cases, the storage medium might be incorporated within a computer system, such as the system 700. In other embodiments, the storage medium might be separate from a computer system (e.g., a removable medium, such as a compact disc, etc.), and/or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 700) to perform methods of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another machine-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 700, various machine-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 725. Volatile media includes, without limitation, dynamic memory, such as the working memory 735. Transmission media includes coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc., carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
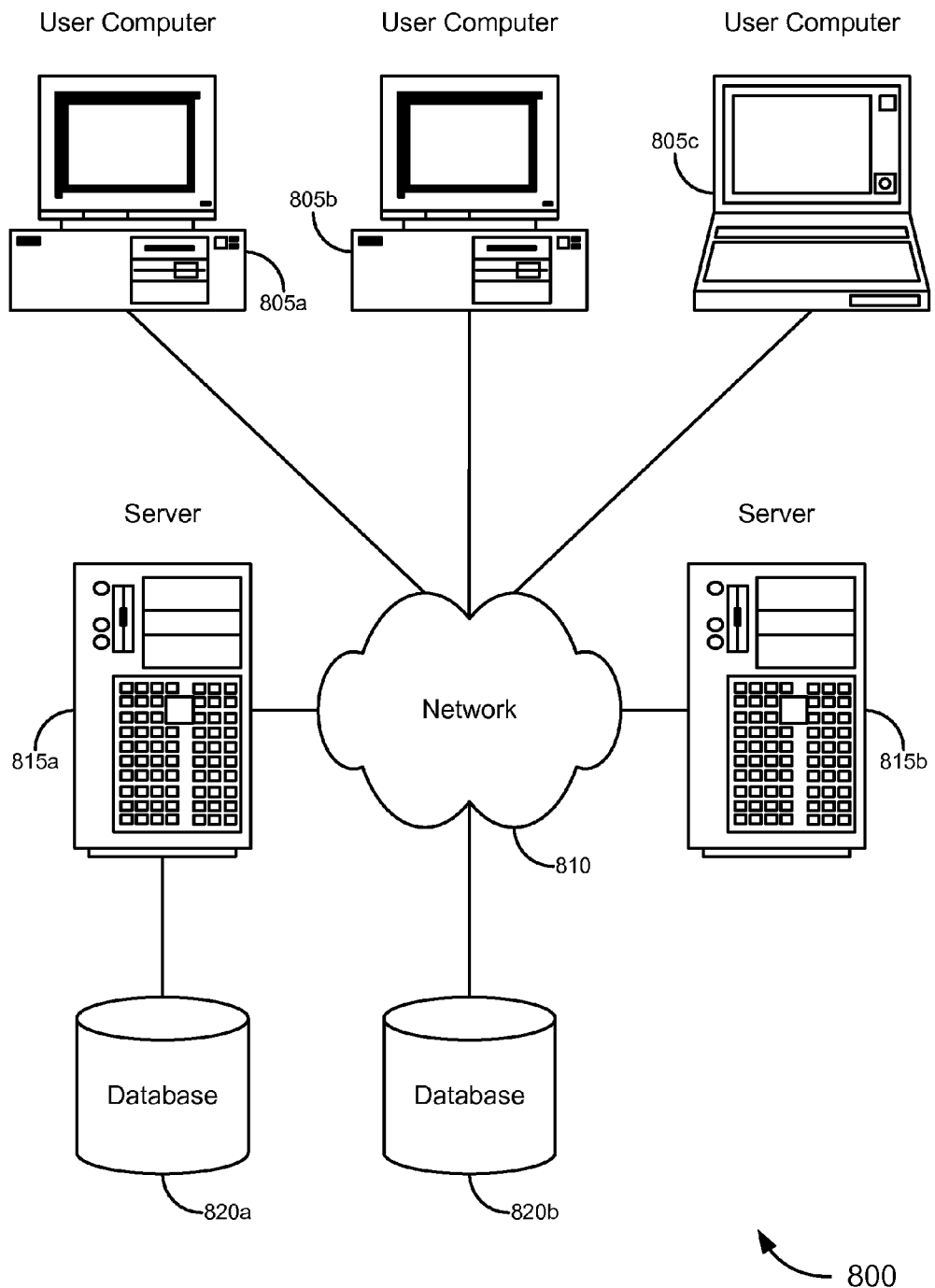
FIG. 8 is a block diagram illustrating a networked system of computers, which can be used in accordance with various embodiments of the invention.

A set of embodiments comprises systems for implementing location-based money transfers. Merely by way of example, FIG. 8 illustrates a schematic diagram of a system 800 that can be used in accordance with one set of embodiments. The system 800 can include one or more user computers 805. The user computers 805 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially available UNIX™ or UNIX-like operating systems. These user computers 805 can also have any of a variety of applications, including one or more applications configured to perform methods of the invention, as well as one or more office applications, database client and/or server applications, and/or web browser applications. Alternatively, the user computers 805 can be any other electronic device, such as a thin-client computer, cellular telephone, Internet-enabled mobile telephone, and/or personal digital assistant (PDA), capable of communicating via a network (e.g., the network 810 described below) and/or displaying and/or navigating web pages or other types of electronic documents. Although the exemplary system 800 is shown with three user computers 805, any number of user computers can be supported.

Certain embodiments of the invention may operate in a networked environment, which can include a network 810. The network 810 can be any type of network familiar to those skilled in the art that can support data communications using any of a variety of commercially available protocols, including without limitation TCP/IP, SNA, IPX, AppleTalk, and the like. Merely by way of example, the network 810 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, mesh network, Code Division Multiple Access (CDMA), Time Division Multiple Access (TDMA), Global System for Mobile communications (GSM), General Packet Radio Service (GPRS), the Bluetooth™ protocol known in the art, and/or any other wireless protocol; and/or any combination of these and/or other networks.

Embodiments of the invention can include one or more server computers 815 or mainframe computers. Each of the server computers 815 may be configured with an operating system, including without limitation any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 may be a web server, which can be used, merely by way of example, to process requests for web pages or other electronic documents from user computers 805. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 805 to perform methods of the invention.

The server computers 815, in some embodiments, might include one or more application servers, which can include one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 805 and/or another server 815. In some embodiments, an application server can create web pages dynamically for displaying the information in accordance with embodiments of the invention, such as web interface 419 (FIG. 4). Data provided by an application server may be formatted as web pages (comprising HTML, Javascript, WML, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement methods of the invention incorporated by an application running on a user computer 805 and/or another server 815. Alternatively, as those skilled in the art will appreciate, a file server can include all necessary files, allowing such an application to be invoked remotely by a user computer 805 and/or server 815. It should be noted that the functions described with respect to various servers herein (e.g., application server, database server, web server, file server, etc.) can be performed by a single server or mainframe computer and/or a plurality of specialized servers or mainframe computers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 815a (and/or a user computer 805). Alternatively, a database 820b can be remote from any or all of the computers 805, 815, so long as the database can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle™ database, that is adapted to store, update, and retrieve data in response to SQL-formatted commands. The database might be controlled and/or maintained by a database server, as described above, for example.

In a further embodiment, a transaction system which includes a loyalty host to administer the loyalty programs may be provided. In some instances, the loyalty host may be a component of the one or more machines included in the transaction system performing other functions. Alternatively, the loyalty host may be a standalone system receiving transaction details from another component of the transaction system. The loyalty host may be used to automatically enroll customers in a loyalty program. Loyalty systems and methods are more fully described in Universal Loyalty Systems and Methods, U.S. patent application Ser. No. 12/190,348, filed on Aug. 12, 2008, and Money Transfer Convenience Card, Systems and Methods, U.S. patent application Ser. No. 10/687,575, filed on Oct. 15, 2003, the complete disclosures of which are hereby incorporated by reference.

In one embodiment, a agent may offer services to perform money transfer transactions. The customer may initiate a money transfer transaction by walking into an agent location and providing details of the money transfer transaction to an agent clerk. Money transfer transaction details may include recipient information, money transfer amount, and/or information about the customer (sender), such as a telephone number. The agent clerk may enter the details into a POS device. When all the details have been entered, the POS device may transmit the transaction information to a transaction host for processing. Alternatively, the customer may stage or initiate a money transfer transaction at a kiosk or other user input device.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with-or without-certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer-implemented method of performing money transfers using location information, the method comprising:
    staging, at a computer system, a money transfer transaction from a sender to a receiver, wherein the money transfer transaction transfers funds from the sender to the receiver;
    receiving the receiver's mobile address at the computer system;
    tracking the receiver's location using the mobile address at a location tracking computer system;
    determining if the receiver is within a proximity threshold to an agent location, wherein the agent location is configured to distribute funds for the money transfer;
    in response to the receiver being within the proximity threshold to the agent location, notifying the receiver, at the receiver's mobile device, of the agent location's address;
    generating a unique transaction identifier at the computer system;
    providing the unique transaction identifier; and
    in response to receiving information from the receiver at the agent location, dispensing the funds at the agent location, wherein the information includes the unique transaction identifier.

2. The method of claim 1, wherein the tracking of the receiver's location is preformed using global positioning system (GPS) information or cellular tower triangulation information.

3. The method of claim 1, wherein the agent location comprises one or more of the following: an automated teller machine (ATM), a kiosk, a retail store, a bank, a check casher, a post office, and a shopping center.

4. The method of claim 1, further comprising providing directions to the agent location.

5. The method of claim 1, wherein the unique identifier is transmitted to the receiver.

6. The method of claim 5, wherein transmission of the unique identifier comprises a secure and/or encrypted transfer.

7. The method of claim 5, wherein the unique identifier comprises one or more of the following: a personal identification number (PIN), money transfer control number (MTCN), a password, the receiver's mobile device identification, an alpha-numeric code, an image, and an account number.

8. The method of claim 1, further comprising displaying a barcode on a display device of the receiver's mobile device, wherein the barcode is representative of the unique identifier.

9. The method of claim 8, wherein the mobile device comprises one or more of the following: a cellular phone, a Smartphone, a personal digital assistant (PDA), and a portable computer.

10. The method of claim 8, wherein the mobile device includes one or more of the following security devices: a retinal scanner, a voice recognition receiver, and a fingerprint scanner.

11. A computer-implemented method for providing location-based funds transfers, the method comprising:
    receiving from a receiver a money transfer request, wherein the request includes an amount and a proposed sender's contact information;
    tracking the proposed sender's location using the contact information;
    determining, using a location-gathering computer system, that the proposed sender is in proximity to at least one money transfer agent location capable of processing the money transfer request;
    notifying the proposed sender of the money transfer request received from the receiver and the location of the at least one money transfer agent location
    requesting authorization from the proposed sender to initiate a money transfer to the receiver for the amount;
    in the event that the proposed sender authorizes the money transfer from the proposed sender to the receiver, initiating the money transfer to the receiver for the amount; and
    notifying the receiver of the money transfer.

12. The method of claim 11, further comprising in response to receiving authorization to initiate the money transfer to the receiver for the amount, initiating the money transfer for the amount.

13. The method of claim 12, wherein initiating of the money transfer for the amount is accomplished by one or more of the following: using the mobile device, at the money transfer agent location, placing a telephone call to a customer service center, and accessing a website.

14. The method of claim 11, further comprising, in response to the proposed sender denying the money transfer request, notifying the receiver of the denial of the money transfer.

* * * * *